(12) United States Patent
Lee

(10) Patent No.: US 7,948,901 B2
(45) Date of Patent: May 24, 2011

(54) DATA TRANSMISSION METHOD AND DEVICE USING CONTROLLED TRANSMISSION PROFILE

(75) Inventor: Jinsock Lee, Tokyo (JP)

(73) Assignee: NEC Corporation, Tokyo (JP)

( * ) Notice: Subject to any disclaimer, the term of this patent is extended or adjusted under 35 U.S.C. 154(b) by 365 days.

(21) Appl. No.: 11/960,756

(22) Filed: Dec. 20, 2007

(65) Prior Publication Data

US 2008/0159337 A1  Jul. 3, 2008

(30) Foreign Application Priority Data

Dec. 28, 2006  (JP) ................................. 2006-354136

(51) Int. Cl.
G01R 31/08  (2006.01)
(52) U.S. Cl. .......................... 370/238; 370/236; 370/394
(58) Field of Classification Search .................. None
See application file for complete search history.

(56) References Cited

U.S. PATENT DOCUMENTS

| | | | |
|---|---|---|---|
| 6,243,759 B1 * | 6/2001 | Boden et al. ................... 709/238 |
| 6,922,557 B2 * | 7/2005 | Fantaske ...................... 455/403 |
| 7,567,575 B2 * | 7/2009 | Chen et al. ................... 370/401 |
| 2003/0050062 A1 | 3/2003 | Chen et al. | |
| 2005/0005207 A1 | 1/2005 | Herneque | |
| 2006/0084389 A1 * | 4/2006 | Beale et al. ................ 455/67.11 |
| 2006/0268701 A1 | 11/2006 | Clark | |
| 2007/0041349 A1 * | 2/2007 | Kim et al. ..................... 370/335 |
| 2007/0153672 A1 * | 7/2007 | Terry et al. ................... 370/206 |
| 2008/0002599 A1 * | 1/2008 | Yau et al. ...................... 370/310 |

FOREIGN PATENT DOCUMENTS

| | | |
|---|---|---|
| EP | 1 691 562 A1 | 8/2006 |
| WO | WO 03/017570 A2 | 2/2003 |
| WO | WO 2005/107187 A1 | 11/2005 |

OTHER PUBLICATIONS

Kazunori Akabane et al., "Error Control Scheme for CP Packet Radio Systems", Vehicular Technology Conference 1999, vol. 1, Sep. 19, 1999, pp. 339-342, XP010352960.

"3GPP TS 25.308 V6 3.0," Technical Specification, Release 6, pp. 1-28 (Dec. 2004).

Korean Patent Office issued a Korean Office Action dated Oct. 19, 2009, Application No. 519980958731.

* cited by examiner

*Primary Examiner* — Robert W Wilson
(74) *Attorney, Agent, or Firm* — Young & Thompson

(57) ABSTRACT

A data transmission method and system by which an arrival delay can be controlled are provided. A node (i) calculates a cumulative delay CUM_DLY(i) of a received packet cumulated up to the current hop, by using an arrival delay of the packet and a cumulative delay CUM_DLY(i-1) cumulated up to the previous hop, and compares the cumulative delay CUM_DLY(i) with a target cumulative delay TAR_CUM_DLY(i), thereby controlling a transmission profile for the packet so that an expected cumulative delay at the next node becomes closer to a target value. The node (i) writes the cumulative delay CUM_DLY(i) in a header of the packet and transmits the packet to the next node using the set transmission profile. Similar transmission profile control is carried out at each transit node in a multi-hop system, whereby the cumulative delay in the entire system can be controlled within a desired range.

23 Claims, 10 Drawing Sheets

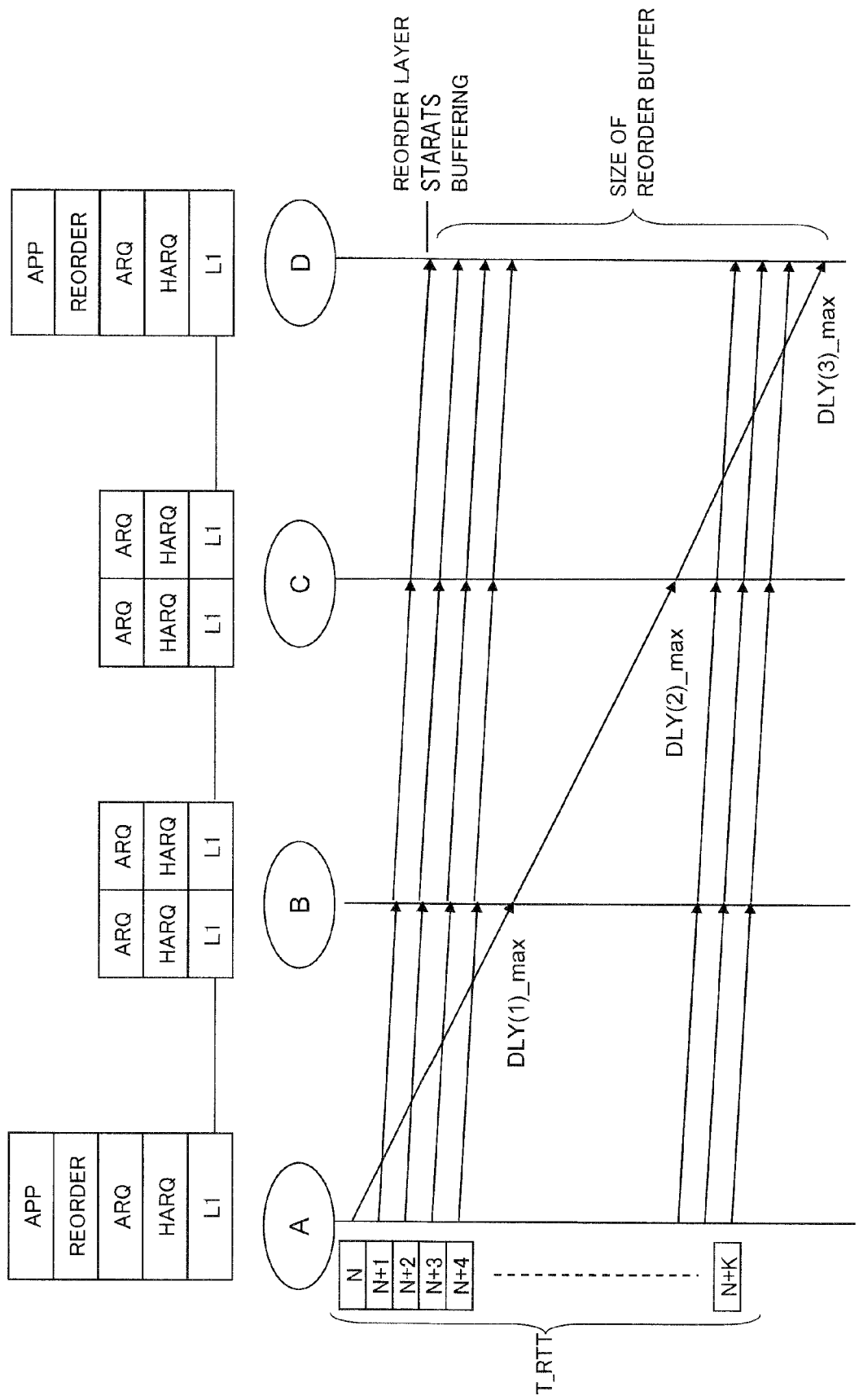

DATA TRANSMISSION METHOD AND DEVICE USING CONTROLLED TRANSMISSION PROFILE

BACKGROUND OF THE INVENTION

1. Field of the Invention

This application is based upon and claims the benefit of priority from Japanese Patent Application No. 2006-354136, filed on Dec. 28, 2006, the disclosure of which is incorporated herein in its entirety by reference.

The present invention relates to a communication system and, more particularly, to a method and a device for transmitting data in a system including a plurality of nodes.

2. Description of the Related Art

Loss of data occurring in a data communication system, no manner whether the system is wired or wireless, affects the upper-layer applications such as Web or mail applications. Therefore, in general, loss of transmitted data is prevented by providing for an ARQ (Automatic Repeat reQuest) function and the like. Known ARQ protocols include Selective-ACK, Go-back-N, Stop&Wait, and the like.

In high-speed packet communication systems using 3G (3rd Generation) HSDPA (High Speed Downlink Packet Access) and the like in particular, a technology called HARQ (Hybrid ARQ) is employed, which enables high-speed retransmission control even in a difficult radio environment (see 3GPP TS 25.308 v6.3.0, December 2004, Technical Specification (Release 6), pp. 18-19) According to HARQ, a receiving side can request a retransmission from a transmitting side by using a simple ACK/NACK feedback, and a packet thus retransmitted is combined with those previously received, whereby the rate of packet reception can be enhanced.

In general, when packets are transmitted through a retransmission protocol, there are some occasions when the amount of time from when a packet is transmitted until it is completely received varies from packet to packet. This is because, since loss can be thought to probabilistically occur to each packet, there is a possibility that loss occurs only once to a packet but occurs several times to another packet. Further, the frequency of a retransmission request or the like is also a cause for the variation in the amount of time required before a packet is completely received. In a radio environment in particular, which sometimes abruptly changes, it can be thought that, in the case of HARQ as well, the amount of time required before a packet is completely received probabilistically changes.

Incidentally, the above-mentioned amount of time required before a packet is completely received is with the addition of the total amount of delay time: a usual transmission delay plus a retransmission delay caused by a retransmission process. However, in the case where the receiving side does not know the time of transmission of a packet on the transmitting side, an "arrival delay" is used, which refers to the amount of time from when the receiving side first detects the receipt of a packet until the packet is completely received, or a count value supposed to be equivalent to this amount of time. In the case where the receiving side can gain a knowledge of the time of transmission of a packet on the transmitting side from a timestamp or the like in the packet, the "arrival delay" can be obtained from that time information. Hereinafter, a brief description will be given of the term "arrival delay," which will be used in the present specification, and of the influence of a large arrival delay on an application.

FIG. 1A is a sequence diagram of retransmissions through the HARQ protocol, to describe the arrival delay DLY of a packet. FIG. 1B is a sequence diagram to describe reordering of arrival packets when their arrival delays differ from one another.

Referring to FIG. 1A, a packet N is transmitted from a node A to a node B through a physical layer L1. However, it is assumed to be determined through a HARQ process at the node B that the packet N has been received incompletely. At this time, the node B sends a NACK back to the node A, and the node A, upon receipt of the NACK, retransmits the packet N to the node B. Here, this retransmission operation is repeated twice before the packet N is completely received by the node B. In the case where a packet is completely received after a retransmission operation has been repeated a plurality of times as described above, the arrival delay DLY is the amount of time from when the packet is first received incompletely until the packet is completely received, or a count value equivalent to this amount of time.

The arrival delay DLY in this case is caused by the HARQ process. However, if an error remains even after the HARQ process, a retransmission process through an ARQ process is carried out. Accordingly, there is a possibility that the arrival delay DLY further increases.

There are some cases where the arrival delay varies from packet to packet as shown in FIG. 1B because the arrival delay caused by a retransmission process probabilistically changes due to an abrupt change in the radio environment and the like. Here, the arrival delay of the packet N becomes large, and the packet N arrives at the node B after a packet (N+1) that has been transmitted later than the packet N. A still larger arrival delay occurs to a packet (N+2), which arrives at the node B after a plurality of packets that have been transmitted later than the packet (N+2).

When a large arrival delay occurs to an intermediate packet among the packets N to (N+M) sequentially transmitted in serial order as described above, the receiving node B, in order to reorder the packets on the receiving side, stores those packets numbered after the delayed packet in a REORDER buffer until the delayed packet arrives. When the delayed packet has arrived, the stored packets are fed in order to an application. Accordingly, it is necessary to determine a size for the REORDER buffer of the receiving node B such that a maximum delay can be absorbed.

Incidentally, single-hop systems including one transmitting node and one receiving node as shown in FIGS. 1A and 1B are not the only communications systems, but multi-hop systems are also conceivable in which a plurality of transit nodes exist between a transmitting node and a receiving node. In such a multi-hop system, it should be thought that packet loss may occur in each hop. Accordingly, the HARQ and ARQ protocols are used for each hop, whereby it is possible to recover packet loss.

FIG. 2 is a sequence diagram to describe the arrival delay in a multi-hop system. Here, for simplicity, it is assumed that two transit nodes B and C exist between a transmitting node A and a receiving node D. If applying the protocols described with reference to FIGS. 1A and 1B to this multi-hop system, protocols corresponding to the physical layer (L1), HARQ layer, ARQ layer, REORDER layer, and application (APP) layer are present in each of the transmitting node A and the receiving node D. Protocols corresponding to the physical layer (L1), HARQ layer, and ARQ layer are present in each of the transit nodes B and C. That is, if drawing attention to the HARQ and ARQ protocols, three pairs of HARQ and ARQ protocol sets are required in the entire system: one pair between the transmitting node A and the transit node B, one pair between the transit nodes B and C, and one pair between the transit node C and the receiving node D. In this case, two HARQ and ARQ protocol sets are present in each of the transit nodes B and C. In such a multi-hop system, packet loss occurring in multiple hops can be recovered through the HARQ and ARQ protocols for each hop.

Moreover, the REORDER layer for transmission in order of packet number is present in each of the transmitting node A and the receiving node D. The REORDER layer of the receiving node D buffers packets received from the ARQ layer of the receiving node D and passes the packets to the APP layer in order of packet number. Moreover, the REORDER layer of the transmitting node A controls the number of packets to transmit, considering the size of the REORDER buffer of the receiving node D.

However, in such a conventional multi-hop system, if an attempt is made to feed packets transmitted from the APP layer of the transmitting node A to the APP layer of the receiving node D in the order in which the packets were transmitted, the overall delay may become large because there is a possibility that an arrival delay occurs in each hop as described above. In addition, the overall delay is proportional to the number of hops in the system. Considering such an overall delay, the transmission buffer of a size required for consecutive transmission is needed at the transmitting node, and the REORDER buffer of a size determined based on a possible maximum delay is needed at the receiving node. The sizes of the buffers are proportional to the number of hops in the system.

For example, as shown in FIG. 2, it is assumed that a maximum arrival delay DLY_max occurs to a packet N in each hop, that the packet N arrives at the receiving node D with the sum of these arrival delays, and that all other packets arrive at the receiving node D without retransmission. In this case, all the other packets (N+1) to (N+K) after the packet N are stored in the REORDER buffer of the receiving node D until the delayed packet N arrives. When the delayed packet N has arrived, the packets are fed to the APP layer of the receiving node D in order of packet number. Accordingly, the packets N to (N+K) are all fed to the APP layer of the receiving node D with the same maximum delay as the delayed packet N. In this case, the size of the REORDER buffer of the receiving node D must be set at a size determined based on the possible maximum delay. If the size of the REORDER buffer is smaller than the size based on the maximum delay, the transmitting node A needs to stop transmission, depending on the buffer size on the receiving side.

In addition, if applying the protocols described with reference to FIGS. 1A and 1B to an existing multi-hop system as they are, the problem arises that the structure of the communications system becomes complicated as a whole. For example, a set of the ARQ and HARQ protocols is required for each hop, and two sets of the ARQ and HARQ protocols (one set for each hop) need to be provided to each transit node.

SUMMARY OF THE INVENTION

The present invention has been made to solve the above-described problems, and an object thereof is to provide a data transmission method and device by which an arrival delay can be controlled.

According to the present invention, a data transmission method in a node which transmits a data signal to a downstream node, includes: controlling a transmission profile to control transmission of the data signal based on a target cumulative delay; and transmitting the data signal to the downstream node according to the transmission profile controlled.

As described above, since a transmission profile used in transmission to a downstream node is controlled based on a target cumulative delay, it is possible to control an arrival delay.

BRIEF DESCRIPTION OF THE DRAWINGS

FIG. 2 is a sequence diagram to describe the arrival delay in a multi-hop system.

DETAILED DESCRIPTION OF THE PREFERRED EMBODIMENTS

Figure 3:
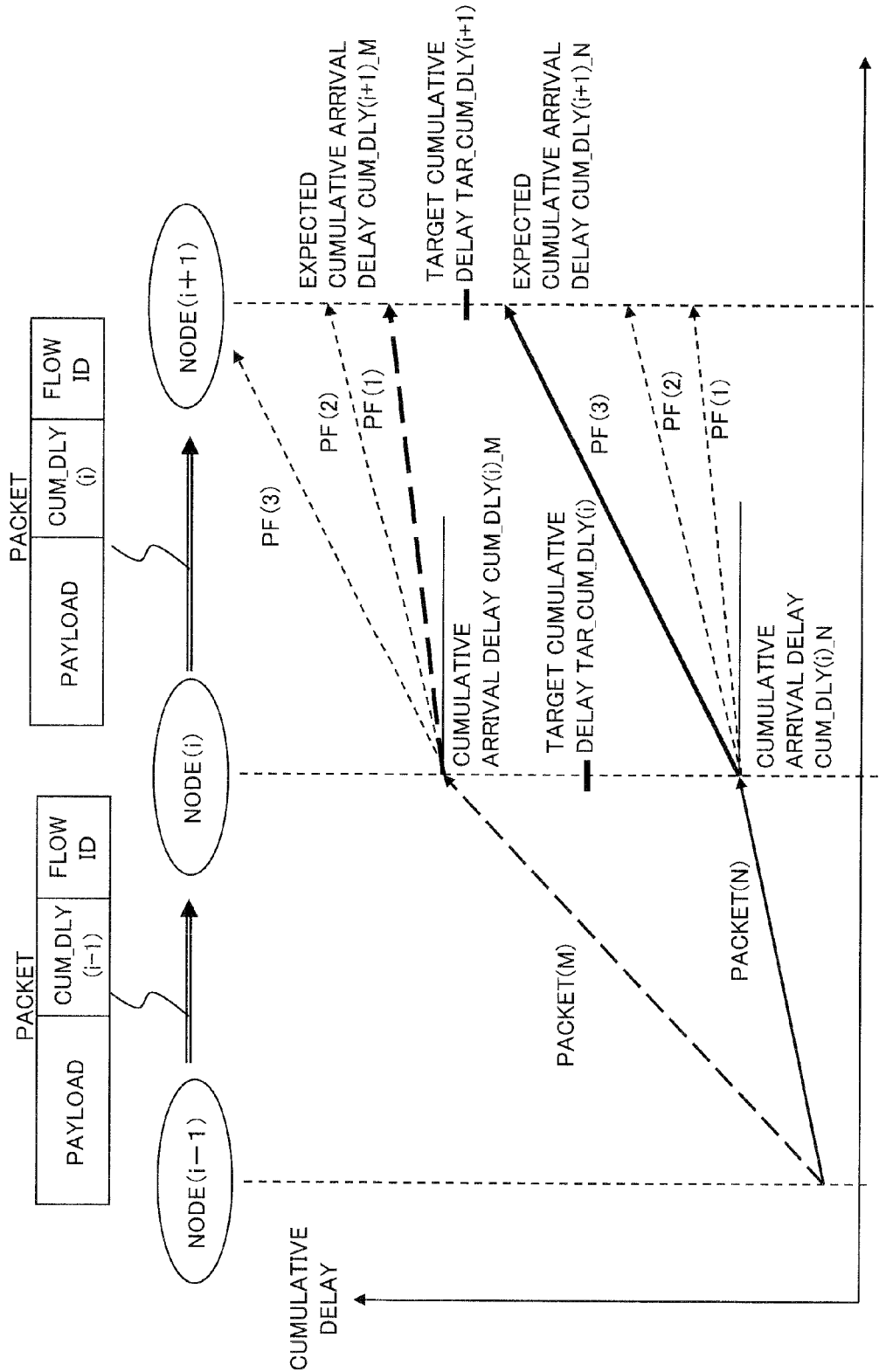
FIG. 3 is a schematic diagram of a communication system, to describe a data transmission method according to an exemplary embodiment of the present invention.

FIG. 3 is a schematic diagram of a communication system, to describe a data transmission method according to an exemplary embodiment of the present invention. Here, for simplicity, it is assumed that a node (i) functions as a transit node that receives a packet from a node (i−1), which is positioned downstream when viewed in the direction of data transmission, and that transmits the received packet to a node (i+1), which is positioned upstream. In other words, the three nodes shown in FIG. 3 constitute a two-hop communication system or part of a communication system including three hops or more. In this communication system, a link corresponding to each hop may be any one of a cable link and a radio link. However, in this example, it is necessary that, at least in the link between the nodes (i) and (i+1), the arrival delay of a packet can be controlled. Incidentally, a node indicates a general communication device connected to a network. In a mobile communications system, for example, nodes include mobile stations, base stations, gateways, routers, repeaters, packet switches, and the like.

The node (i) receives a packet from the node (i−1) In a predetermined field of a header of the received packet, a cumulative arrival delay CUM_DLY(i−1), which is given by the node (i−1), is stored. As will described later, the node (i) replaces the cumulative arrival delay CUM_DLY(i−1) with a cumulative arrival delay CUM_DLY(i), which is a delay cumulated up to the node (i) itself, and transmits the packet in question to the node (i+1) in accordance with a selected transmission profile PF.

The field in which a cumulative arrival delay CUM_DLY updated by each node is to be written is provided beforehand in a header of a packet. Moreover, a flow ID for identifying the type of flow of each packet can also be included in the header, which will be described later. The reason for the provision of this flow ID is that, for a flow of which real-time performance is required, control is performed so that the overall cumulative arrival delay becomes small, but for a flow of which no real-time performance is required, the cumulative arrival delay can be set large. Note that, although the header of a packet shown in FIG. 3 only includes the fields for the cumulative arrival delay CUM_DLY and the flow ID in order to avoid complexity, the header can also include other required header information such as a source address and a destination address.

First, a target cumulative delay TAR_CUM_DLY and the cumulative arrival delay CUM_DLY shown in FIG. 3 will be described.

1. Target Cumulative Delay TAR_CUM_DLY

A target cumulative delay TAR_CUM_DLY(i) is a target value for the cumulative amount of delay of a packet, cumulated from when the packet is transmitted by a transmission source node until the packet arrives in a complete form at the transit node (i). As described above, there are some occasions when the setting of the target cumulative delay is changed depending on the type of flow. For example, in a TELNET service or the like, the target cumulative delay is set small so that fast response rates are provided to users. However, in transmission and reception of mail data between mail servers, it is preferable that the target cumulative delay be set large so as to reduce the load on a transit node. The target cumulative delay TAR_CUM_DLY(i) can be set as follows.

1.1) Before transmission is started, the target cumulative delay TAR_CUM_DLY at each node can be set in advance based on a total target delay DLY_total between the transmitting node and the receiving node. For example, if N hops in total are present in a flow (i.e., the number of all nodes involved is N+1), the target cumulative delay TAR_CUM_DLY(i) at the transit node (i) positioned at the L-th hop is set at L/N of the total target delay DLY_total. This is represented by the following equation:

TAR_CUM_DLY(i)=DLY_total×L/N.

1.2) In the case where the bandwidth of each hop differs from the others, it is also possible that different target cumulative delays are set depending on the bandwidths. Specifically, a larger target cumulative delay TAR_CUM_DLY can be set for a hop having a narrower bandwidth, and a smaller target cumulative delay TAR_CUM_DLY can be set for a hop having a wider bandwidth. That is, this can be represented by the following equation:

TAR_CUM_DLY(i)=W(L)×DLY_total×L/N where W(1)+W(2) . . . +W(N)=1.

1.3) It is also possible that each transit node sets a target cumulative delay for each packet, without advance setting. Specifically, the transit node (i) calculates the target cumulative delay from the total target delay DLY_total, the number N of all hops, and the number L of hops through which a packet in question has passed up to the current hop. That is, this is represented by the following equation:

TAR_CUM_DLY(i)=DLY_total×L/N.

In this manner, it is assumed that the target cumulative delays TAR_CUM_DLY(i) and TAR_CUM_DLY(i+1) are set in the nodes (i) and (i+1), respectively, in advance or for each packet, as shown in FIG. 3.

As described above, the method of setting the target cumulative delay TAR_CUM_DLY is not uniquely specified. For example, it is also conceivable that various types of digital equipment constitute an ADHOC network and each piece of the digital equipment carries out multi-hop communications with another one. As a specific example, if there are two paths having different numbers of hops between a transmitting node S1 and a receiving node D1, namely a path A (S1-N1-N2-D1) including two transit nodes N1 and N2, and a path B (S1-N1-D1) including one transit node N1, then in the transit node N1, the target cumulative delay is set at DLY_total/2 for the flow of the path A, and at DLY_total/3 for the flow of the path B. As described above, if the path for a packet to travel along varies from flow to flow, the target cumulative delay can be set for each flow. Alternatively, if the path is fixed, the target cumulative delay may be uniquely set. As described above, the granularity of setting is not uniquely specified.

2. Cumulative Arrival Delay CUM_DLY

The node (i) reads the cumulative arrival delay CUM_DLY(i−1) from a packet that has arrived from the node (i−1), and also obtains the cumulative arrival delay CUM_DLY(i) at the node (i) by calculating an arrival delay DLY(i), a delay that has occurred to this packet between the nodes (i−1) and (i), and adding the cumulative arrival delay CUM_DLY(i−1) and the arrival delay DLY(i).

Figure 1A:
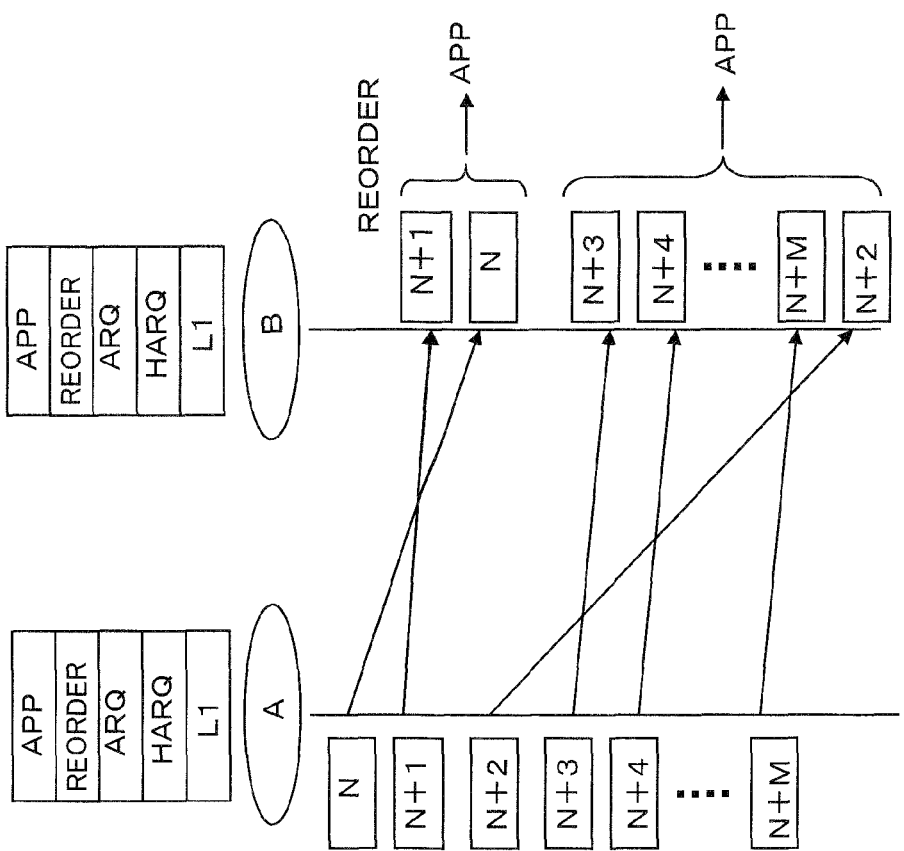
FIG. 1A is a sequence diagram of retransmissions through the HARQ protocol, to describe the arrival delay DLY of a packet.
Figure 1B:
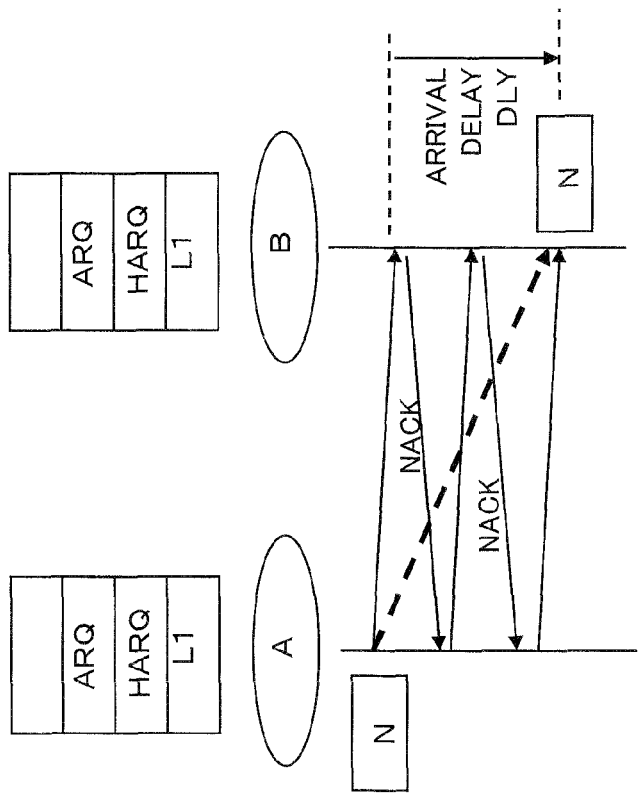
FIG. 1B is a sequence diagram to describe reordering of arrival packets in the case where their arrival delays differ from one another.

The arrival delay DLY(i) is defined as described with reference to FIG. 1A. Specifically, the arrival delay DLY(i) can be calculated as follows.

In the case where the retransmission process is synchronous HARQ, the number of HARQ transmissions detected by the node (i) is supposed to be the arrival delay DLY(i)

In the case where the retransmission process is asynchronous HARQ, the period from the time of arrival indicated by the indicator in a first packet to be detected by the node (i) until the packet is completely received, is supposed to be the arrival delay DLY(i).

In the case where the nodes (i−1) and (i) are in synchronism with each other based on time information, the time difference between the time of transmission of a packet, which is written in the packet by the node (i−1), and the time of arrival of the packet, is supposed to be the arrival delay DLY(i).

The cumulative arrival delay CUM_DLY(i) is calculated by using the arrival delay DLY(i) thus obtained and the cumulative arrival delay CUM_DLY(i−1) read from the received packet, as follows:

CUM_DLY(i)=CUM_DLY(i−1)+DLY(i).

This obtained cumulative arrival delay CUM_DLY(i) is written in the CUM_DLY field of the received packet.

3. Transmission Profile Control

The node (i) is provided with a plurality of transmission profiles PF used when a packet is transmitted to the next node (i+1), which will be described later. In FIG. 3, it is assumed that transmission profiles PF(1) to PF(3) are provided, each producing a different expected arrival delay before a packet arrives at the destination node (i+1).

It is sufficient that the transmission profile is composed of parameters (transmission parameters) involved in packet transmission-related control. In many cases, the transmission parameters are in correlation with the occurrence of an error to a packet or the incidence of incomplete reception of a packet. Therefore, by selecting a transmission profile composed of transmission parameters, the arrival delay of a packet can be probabilistically controlled. For example, a plurality of transmission parameters (transmission power, transmission frequency, etc.) are set as a transmission profile, and with such settings, it is possible to set a transmission profile A1 associated with an arrival delay D1 and to set a transmission profile A2 associated with an arrival delay D2.

In the case of a radio link, transmission power can be cited as a typical example of a transmission parameter to be controlled. A reduction in the transmission power increases the number of retransmissions due to an error occurring to a packet or incomplete reception of a packet, and resultantly can make the expected arrival delay large. Conversely, an increase in the transmission power enhances the probability of complete arrival of a packet, and resultantly can make the expected arrival delay small. This phenomenon similarly occurs in the case of a cable link. For example, in optical communication, the probability of complete arrival of a packet can be controlled by controlling optical power. The expected arrival delay can be controlled by making a change in a transmission channel (transmission period or transmission frequency) or by varying the number of transmission antennas, apart from the transmission power.

If such transmission profiles PF are stored in association with expected arrival delays obtained from the respective values of the transmission profiles PF, an appropriate transmission profile PF can be selected based on a required expected arrival delay. FIG. 3 shows an example in which the expected arrival delay obtained by a transmission profile becomes larger in the order of the transmission profiles PF(1), PF(2), and PF(3).

The node (i) compares the cumulative arrival delay CUM_DLY(i) calculated as described above with the target cumulative delay TAR_CUM_DLY(i). Based on a result of this comparison, the node (i) can select a transmission profile such that the difference between the expected cumulative arrival delay and the target cumulative delay at the next node (i+1) will become smaller. For example, if the delay cumulated up to the current hop is larger than the target, that is, if CUM_DLY(i)>TAR_CUM_DLY(i), a transmission profile associated with a small expected arrival delay is selected depending on the difference. Conversely, if the delay cumulated up to the current hop is smaller than the target, that is, if CUM_DLY(i)<TAR_CUM_DLY(i), a transmission profile associated with a large expected arrival delay can be selected depending on the difference.

According to the example shown in FIG. 3, since the cumulative arrival delay CUM_DLY(i)_M of a packet (M) is larger than the target cumulative delay TAR_CUM_DLY(i), the node (i) selects the transmission profile PF(1) so that the expected cumulative arrival delay CUM_DLY(i+1)_M at the node (i+1) will become the closest to the target cumulative delay TAR_CUM_DLY(i+1) at the node (i+1). As to another packet (N), the cumulative arrival delay CUM_DLY(i)_N is smaller than the target cumulative delay TAR_CUM_DLY(i). Therefore, the node (i) selects the transmission profile PF(3) so that the expected cumulative arrival delay CUM_DLY(i+1)_N at the next node (i+1) will become the closest to the target cumulative delay TAR_CUM_DLY(i+1) at the node (i+1). By setting the transmission profile in this manner, it can be expected that the difference between the cumulative arrival delay and the target cumulative delay at the node (i+1) becomes smaller than the difference at the node (i). As for a packet arriving with as much a delay as the target cumulative delay, the transmission profile PF(2), for example, is selected, whereby a delay around the target cumulative delay can be expected also at the next node (i+1).

Alternatively, it is also possible that the node (i) determines such an expected arrival delay that the expected cumulative arrival delay CUM_DLY(i+1) at the node (i+1), which is obtained by adding the cumulative arrival delay CUM_DLY(i) and this expected arrival delay, will become the closest to the target cumulative delay TAR_CUM_DLY(i+1) at the node (i+1), and then selects a transmission profile PF accomplishing the expected arrival delay. As described above, the method of selecting a transmission profile is not uniquely specified either.

Moreover, even in the case where the packet (N) arrives at the node (i) earlier than the packet (M) although the packet (M) precedes the packet (N) in transmission, it is possible to increase the possibility that the packets (M) and (N) arrive at the receiving node in the first-set order of transmission, by selecting a transmission profile associated with a small expected arrival delay for the packet (M) and selecting a transmission profile associated with a large expected arrival delay for the earlier-arriving packet (N).

In the case of a radio link, there are some occasions where a radio environment changes abruptly, and a packet does not always arrive at the next node (i+1) as expected. Even in such a case, a plurality of transit nodes carry out similar transmission profile control, whereby the transmission of packets pursuant to initially-set target cumulative delays can be achieved as a whole with high probability.

4. Configuration of Transit Node

Figure 4:
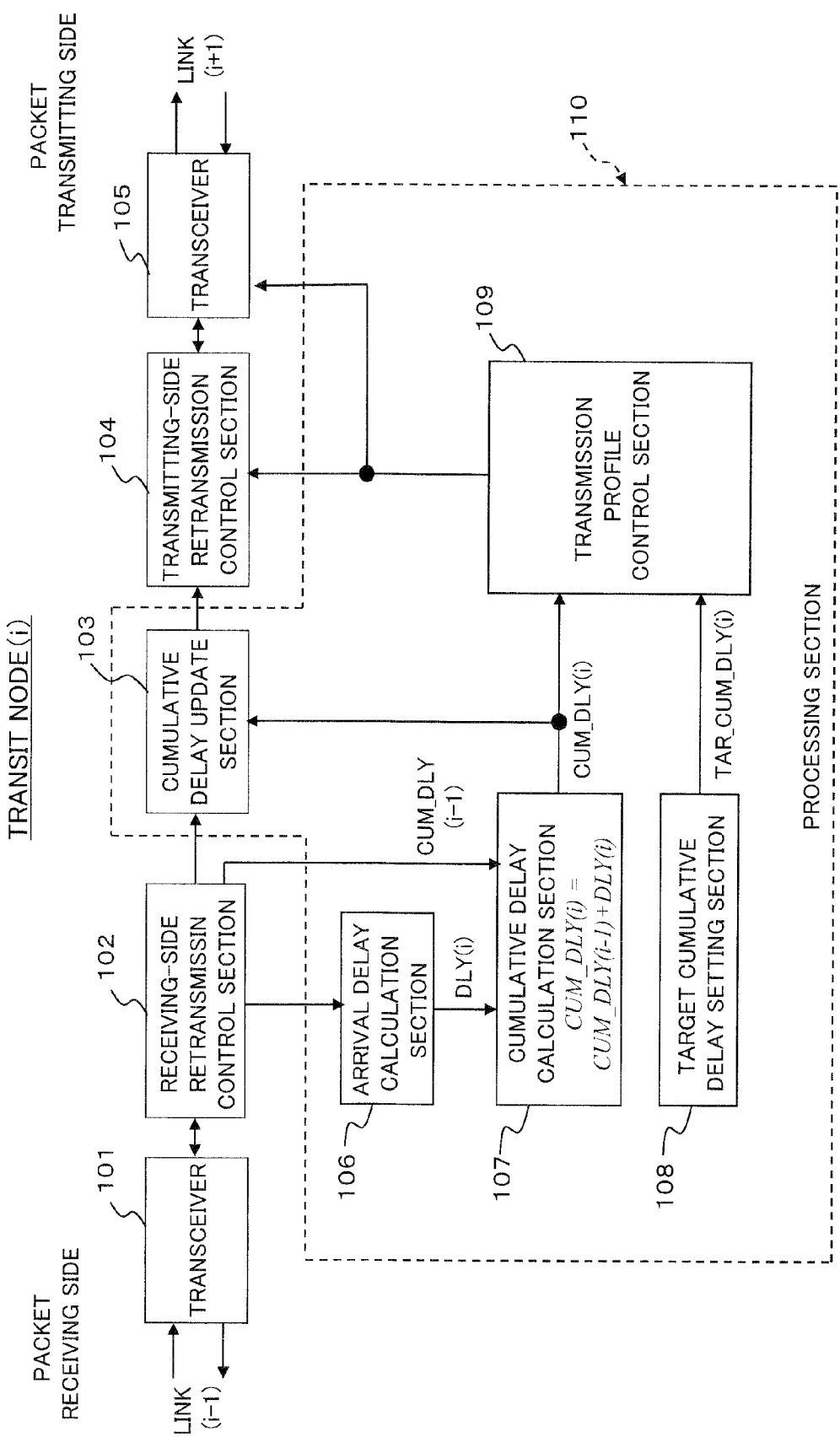
FIG. 4 is a block diagram showing a schematic configuration of a communication device according to the exemplary embodiment of the present invention.

FIG. 4 is a block diagram showing a schematic configuration of a communication device according to the present exemplary embodiment of the present invention. Here, for simplicity, shown is an example of the configuration in the case where a packet is transmitted from the left side to the right side of the drawing.

Referring to FIG. 4, a transceiver 101 is connected to a node (i−1) through a link (i−1). A receiving-side retransmission control section 102 carries out a retransmission process when a packet received through the link (i−1) is incomplete or in error. A completely received packet is transferred to a transmitting-side retransmission control section 104 via a cumulative delay update section 103. In this event, the cumulative delay update section 103 writes the cumulative arrival delay CUM_DLY(i), calculated at its own node (i), in the CUM_DLY field of the header of this packet. A transceiver 105 is connected to a node (i+1) through a link (i+1). The transmitting-side retransmission control section 104 carries out a retransmission process when a packet transmitted through the link (i+1) is not completely received by the node (i+1).

When the receiving-side retransmission control section 102 has carried out the retransmission process with the node (i−1) as described above, the receiving-side retransmission control section 102 provides an arrival delay calculation section 106 with information such as the number of retransmissions made before the packet has completely arrived, a period of time that has passed since the first incomplete receipt of the packet was detected, or a timestamp in the packet. The arrival delay calculation section 106 calculates the arrival delay DLY(i) of the packet in question based on the above-mentioned information, as described above (see "2. Cumulative Arrival Delay CUM_DLY"), and outputs the calculated arrival delay DLY(i) to a cumulative delay calculation section 107. Moreover, the receiving-side retransmission control section 102 reads the cumulative arrival delay CUM_DLY(i−1) at the node (i−1) from the CUM_DLY field of the header of the arrival packet and outputs the read cumulative arrival delay CUM_DLY(i−1) to the cumulative delay calculation section 107.

The cumulative delay calculation section 107 calculates the cumulative arrival delay CUM_DLY(i) at its own node (i) by adding the arrival delay DLY(i) and the cumulative arrival delay CUM_DLY(i−1) and outputs this cumulative arrival delay CUM_DLY(i) to the above-mentioned cumulative delay update section 103, which then writes the cumulative arrival delay CUM_DLY(i) in the CUM_DLY field of the received packet. Moreover, a target cumulative delay setting section 108 sets the target cumulative delay TAR_CUM_DLY(i) as described above (see "1. Target Cumulative Delay TAR_CUM_DLY").

A transmission profile control section 109 carries out the transmission profile control as described above (see "3. Transmission Profile Control"), by using the cumulative arrival delay CUM_DLY(i) and the target cumulative delay TAR_CUM_DLY(i), for each packet received from the cumulative delay update section 103, and sets a selected transmission profile on the transceiver 105 under the control of the transmitting-side retransmission control section 104. The transceiver 105 transmits each packet based on transmission parameters such as transmission power and/or transmission channel and the like according to the set transmission profile, which is set for each packet to be transmitted. The transmitting-side retransmission control section 104 keeps the transmitted packet and the corresponding transmission parameters until an ACK is received. For a packet to which a NACK is returned or neither ACK nor NACK is retuned even after a predetermined period of time has passed, the transmitting-side retransmission control section 104 initiates a retransmission process and retransmits the packet in question in accordance with the transmission parameters corresponding to this packet. As described above, for example, as to a packet for which low transmission power is set, the number of retransmissions may be large because the probability is high that a request for retransmission is sent from the downstream node (i+1) on the receiving side, and hence the arrival delay may resultantly become large.

Note that a processing section 110, which includes the cumulative delay update section 103, arrival delay calculation section 106, cumulative delay calculation section 107, target cumulative delay setting section 108, and transmission profile control section 109, carries out the above-described operations in synchronism with the timing of a packet that has completely arrived under the control of the receiving-side retransmission control section 102. The transmitting-side retransmission control section 104, in response to a request for retransmission from the downstream node (i+1), carries out the retransmission process as described above by using the transmission parameters corresponding to a packet requested to be retransmitted.

The processing section 110 can also be implemented by executing programs corresponding to the respective sections on a program-controlled processor such as a CPU. In this case, the processing section 110 in FIG. 3 is replaced by the program-controlled processor, which can read each program from a program memory and carry out the above-described transmission profile control by using necessary memory.

5. Operation of Transit Node

Figure 5:
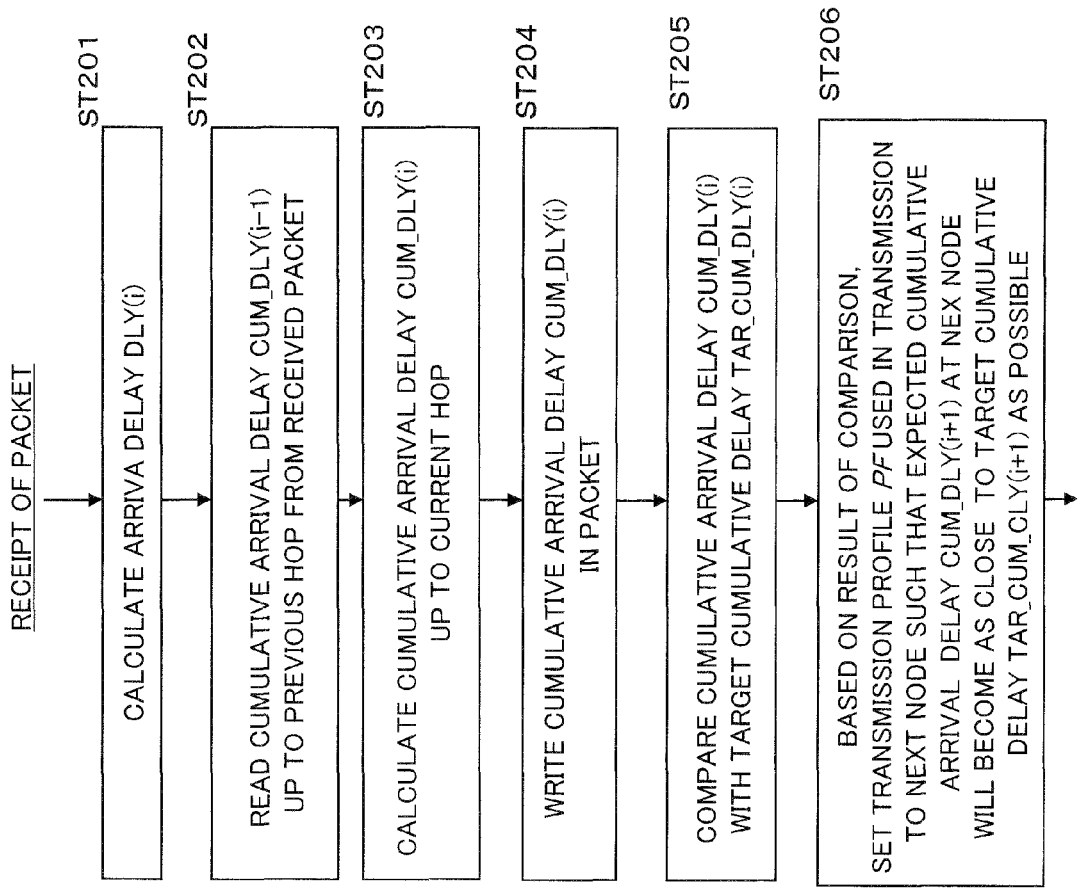
FIG. 5 is a flow chart showing data transmission operation of the communication device according to the exemplary embodiment of the present invention.

FIG. 5 is a flow chart showing data transmission operation of the communication device according to the present exemplary embodiment of the present invention. First, when a packet is completely received from the node (i−1), the arrival delay calculation section 106 calculates the arrival delay DLY(i) of this packet (ST201), and the receiving-side retransmission control section 102 reads from the header of the packet the cumulative arrival delay CUM_DLY(i−1) cumulated up to the previous hop (ST202).

Subsequently, the cumulative delay calculation section 107 calculates the cumulative arrival delay CUM_DLY(i) at its own node (i) by adding the arrival delay DLY(i) and the cumulative arrival delay CUM_DLY(i−1) (ST203) and writes the calculated cumulative arrival delay CUM_DLY(i) in the header of the packet (ST204). The transmission profile control section 109 compares the cumulative arrival delay CUM_DLY(i) with the target cumulative delay TAR_CUM_DLY(i) (ST205) and, depending on which one is larger and what is a difference between them, sets a transmission profile PF such that, as an example here, the expected cumulative arrival delay CUM_DLY(i+1) at the next node (i+1) will become as close to the target cumulative delay TAR_CUM_DLY(i+1) at the next node (i+1) as possible (ST206).

6. First Example 6.1) Repeater as Transit Node

Figure 6:
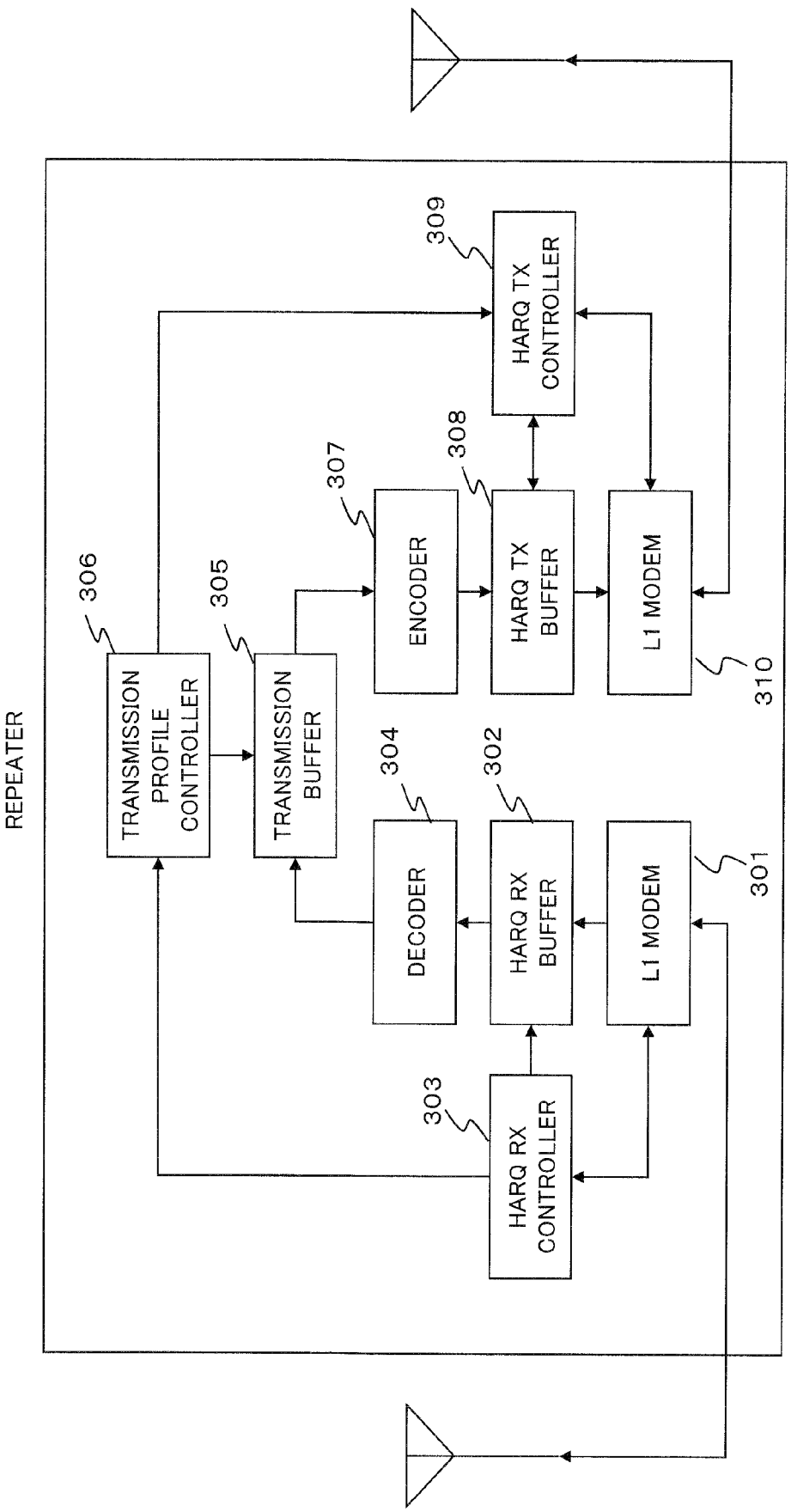
FIG. 6 is a block diagram showing a schematic configuration of a communication device according a first example of the present invention.

FIG. 6 is a block diagram showing a schematic configuration of a communication device according to a first example of the present invention. In this example, used is a repeater provided with HARQ only as a retransmission protocol. A receiving-side L1 modem 301 receives a packet through a cable link or radio link and stores the packet in a HARQ_RX buffer 302. When a HARQ_RX controller 303 detects the incomplete receipt of the packet, the HARQ_RX controller 303 controls the L1 modem 301, whereby a HARQ process is started. When the packet in question is completely received through the HARQ process, information about the arrival delay of this packet is notified to a transmission profile controller 306. At the same time, this received packet is decoded by a decoder 304 and is stored in a transmission buffer 305.

The transmission profile controller 306 carries out the transmission profile control as described above (see "3. Transmission Profile Control"), writes a calculated cumulative arrival delay CUM_DLY(i) at its own node (i) in the header of the packet stored in the transmission buffer 305, and further outputs a selected transmission profile to a transmitting-side HARQ_TX controller 309. The HARQ_TX controller 309 sets up an L1 modem 310 in accordance with the transmission profile. The packet in which the cumulative arrival delay CUM_DLY has been updated by the transmission buffer 305 is encoded by an encoder 307 and then transferred to the L1 modem 310 via a HARQ_TX buffer 308. The packet is then transmitted in accordance with the set transmission profile.

6.2) Multi-Hop System

Figure 7:
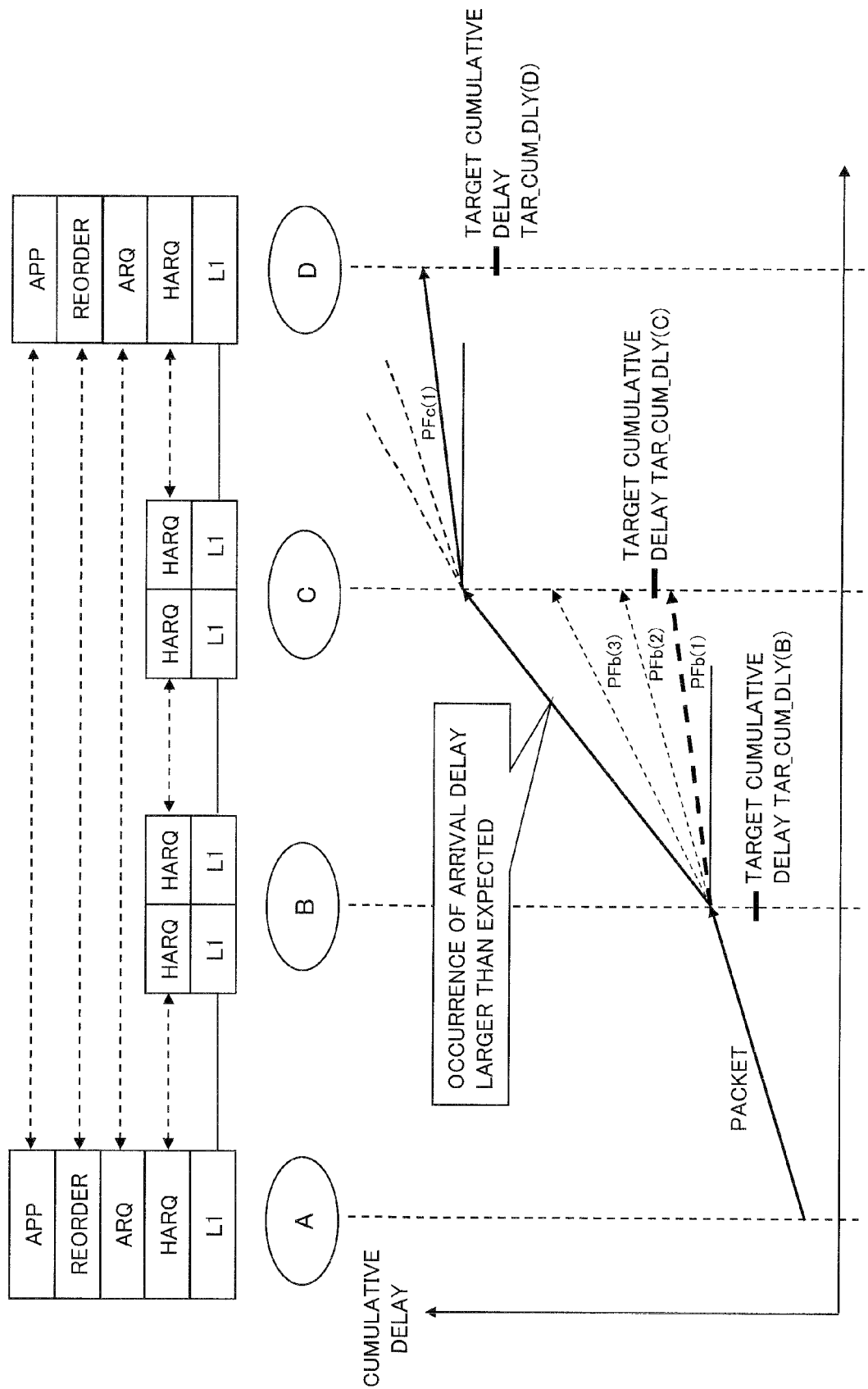
FIG. 7 is a diagram showing protocol stacks and a graph showing variations of the cumulative amount of delay, to describe operation of a multi-hop system using the communication device according to the first example as a transit node.

FIG. 7 is a diagram showing protocol stacks and a graph showing variations of the cumulative amount of delay, to describe operation of a multi-hop system in which the communication device according to the present example is used as a transit node. Here, for simplicity, it is assumed that two transit nodes B and C exist between a transmitting node A and a receiving node D. This structure is an example of the system including a plurality of nodes, and the number of transit nodes is not limited to two as in this example. The system may be a two-hop system including a single transit node, or may be a (m+1)-hop system including m (m>2) transit nodes.

In each of the transmitting node A and the receiving node D, protocols corresponding to the physical layer (L1), HARQ layer, ARQ layer, REORDER layer, and APP layer are present. On the other hand, according to the present example, protocols corresponding to the physical layer (L1) and HARQ layer are present in each of the transit nodes B and C. That is, the HARQ and ARQ protocols are applied only to the transmitting node A and the receiving node D, and merely the HARQ protocol is placed in the transit nodes B and C. In other words, one pair of the HARQ protocols is required between the transmitting node A and the transit node B, one pair, between the transit nodes B and C, and one pair, between the transit node C and the receiving node D. One pair of the ARQ protocols is present between the transmitting node A and the receiving node D. Accordingly, this multi-hop system includes three pairs of the HARQ protocols and one pair of the ARQ protocols as a whole. Here, in each of the transit nodes B and C, two HARQ protocols are present. In this system, packet loss occurring in multiple hops is first recovered through the HARQ protocol, and if it cannot be recovered through the HARQ protocol, the packet loss is recovered through the ARQ protocol at a terminal of transmission/reception.

Moreover, in each of the transmitting node A and the receiving node D, the REORDER layer is present to accomplish transmission in order of packet number. The REORDER layer of the receiving node D buffers packets received from the ARQ layer of the receiving node D and passes the packets to the APP layer in order of packet number. The REORDER layer of the transmitting node A controls the number of packets to transmit, considering the size of the REORDER buffer of the receiving node D.

6.3) Effects 6.3.1) In the case of applying the present example to the transit nodes B and C in such a multi-hop system, even when an arrival delay exceeding a target value occurs, since each transit node controls the transmission profile so that the delay will be reduced, a packet can be transmitted with an arrival delay close to the target value as a whole. Accordingly, it is possible to set the size of the REORDER buffer of the receiving node smaller than conventional ones.

For example, when the transit node B has completely received a packet transmitted from the transmitting node A, if the cumulative arrival delay of the packet exceeds a target cumulative delay TAR_CUM_DLY(B), then the transit node B sets a transmission profile (here, PFb(1)) supposed to make a cumulative arrival delay at the next node C the closest to a target cumulative delay TAR_CUM_DLY(C) at the node C. However, there are some cases where, despite the transmission using this transmission profile PFb(1), the HARQ process is carried out a plurality of times between the transit nodes B and C due to a change in the communication environment, with the result that the cumulative arrival delay when the transit node C has completely received the packet exceeds by far the target cumulative delay TAR_CUM_DLY(C). In this case, the transit node C, as the transit node B did, sets a transmission profile (here, PFc(1)) supposed to make a cumulative arrival delay at the next node D the closest to a target cumulative delay TAR_CUM_DLY(D) at the node D, and then transmits the packet in accordance with the set transmission profile. Each transit node carries out such transmission profile control, whereby it can be expected that, resultantly, the packet arrives at the receiving node D with a delay close to the target cumulative delay TAR_CUM_DLY (D). The degree of this expectation rises as the number of transit nodes increases, and it can be expected that a cumulative arrival delay at the receiving node is close to the first-set or initially-set value of target cumulative delay.

6.3.2) Moreover, since the transmission profile control is carried out at each transit node so that the cumulative arrival delay of each packet is made up for, the possibility is high that the packets arrive at the receiving node eventually in the same order that the packets were transmitted from the transmitting node. Accordingly, the size of the REORDER buffer at the receiving node can be set smaller than conventional ones. In addition to this, variation over time in the quantity of packets sequentially fed to an application at the receiving node is uniformized, and accordingly the influence on the application can be reduced.

Figure 8:
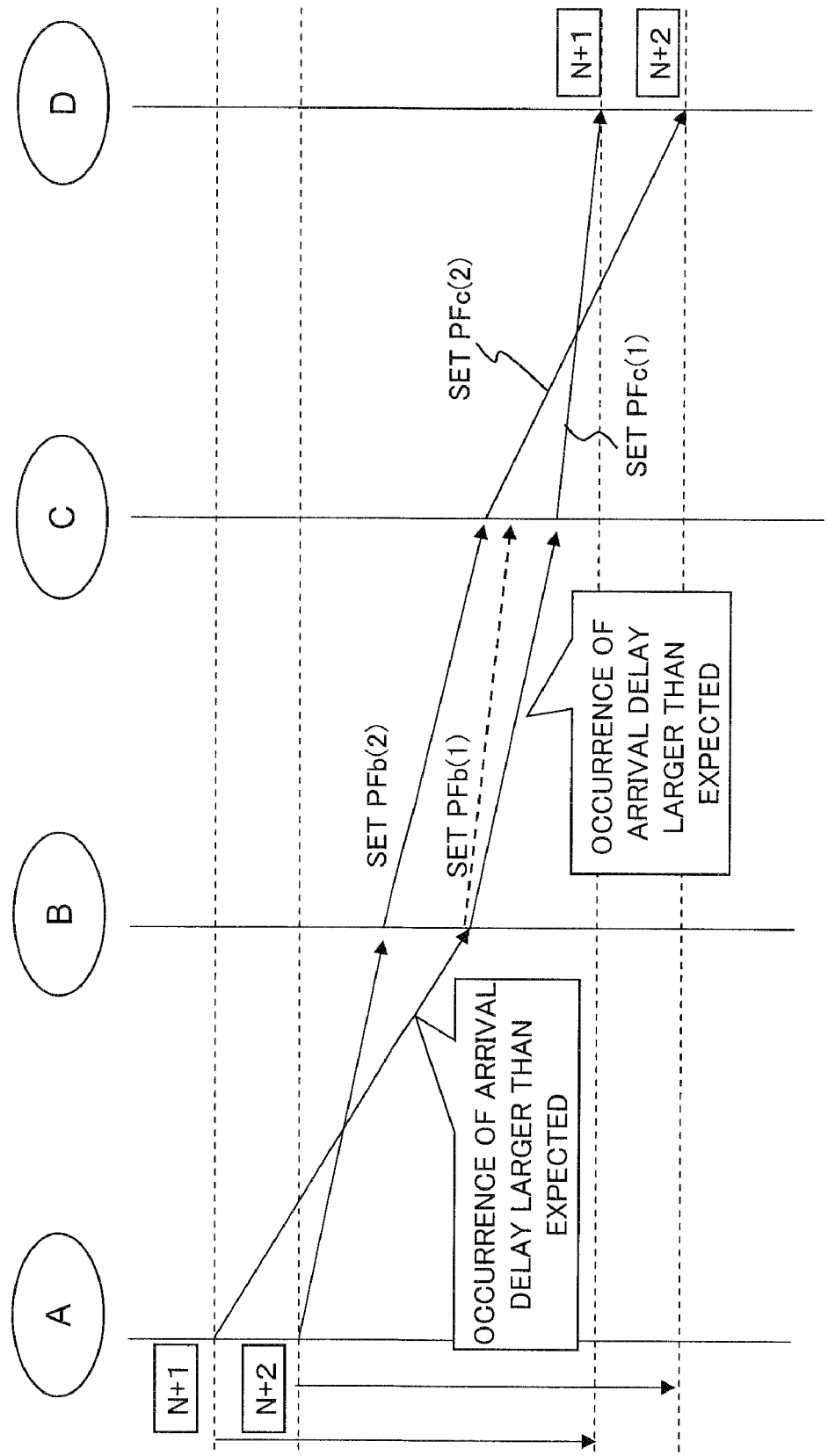
FIG. 8 is a sequence diagram of packet transmissions, showing an example of the effects of transmission profile control according to the first example.

FIG. 8 is a sequence diagram of packet transmissions, showing an example of the effects of the transmission profile control according to the present example. First, it is assumed that packets (N+1) and (N+2) have been transmitted in this order from the transmitting node A, but an arrival delay larger than expected has occurred to the preceding packet (N+1) in a first hop between the nodes A and B, with the result that the subsequent packet (N+2) has arrived earlier at the node B. For example, this situation applies to the case where the packet (N+2) is received through only one transmission, but the packet (N+1) needs four transmissions through the HARQ process before it is received.

In this case, the transit node B starts transmitting the packets to the node C with such transmission profiles that an expected number of transmissions of the packet (N+1) will be smaller than that of the packet (N+2). That is, the packet (N+1) is transmitted with a transmission profile PF(1) that makes a smaller expected arrival delay of the packet (N+1) than that of the packet (N+2), and the packet (N+2) is transmitted with a transmission profile PF(2) that makes a larger expected arrival delay.

However, if an arrival delay larger than expected occurs to the packet (N+1) also in this second hop, the packets (N+2) and (N+1) arrive at the node C in delay states similar to those in the case of the node B. In this case, the arrival delay occurring in the first hop has not been recovered in the cumulative arrival delay of the packet (N+1). Accordingly, the node C similarly starts transmitting the packets to the node D with such transmission profiles PFc(1) and PFc(2) that an expected number of transmissions of the packet (N+1) will be smaller than that of the packet (N+2). Assuming that a difference made by the transmission profiles PFc(1) and PFc(2) is large, the possibility is high that the packet (N+1) arrives at the receiving node D earlier than the packet (N+2) if these packets arrive with arrival delays as expected in a third hop between the nodes C and D.

Each transit node carries out such transmission profile control, whereby it can be expected that the packets eventually arrive at the receiving node D in the same order that they were transmitted from the transmitting node A. The degree of this expectation rises as the number of transit nodes increases, and it can be expected that the quantity of packets stored in the REORDER buffer of the receiving node is reduced.

Moreover, as described above, since a transmission profile is set for every packet at each transit node such that the packet meets a target cumulative delay TAR_CUM_DLY, the transmission period per packet can be made constant. According to the conventional techniques, the probability distribution of transmission periods widens as the number of hops increases. That is, the width of the distribution of transmission periods is large because the time of arrival of each packet is sometimes earlier and is sometimes later. Such nonuniformity of the transmission period is not preferable to an upper layer. According to the present example, it can be expected that the transmission period per packet is made constant, and accordingly the influence on the upper layer is reduced.

7. Second Example

In the above-described first example, the number of transmissions through a retransmission process is probabilistically set based on the cumulative arrival delay and the target cumulative delay, whereby the cumulative arrival delay is controlled resultantly. Accordingly, the type of retransmission process is of no great importance in the transmission profile control.

Figure 9:
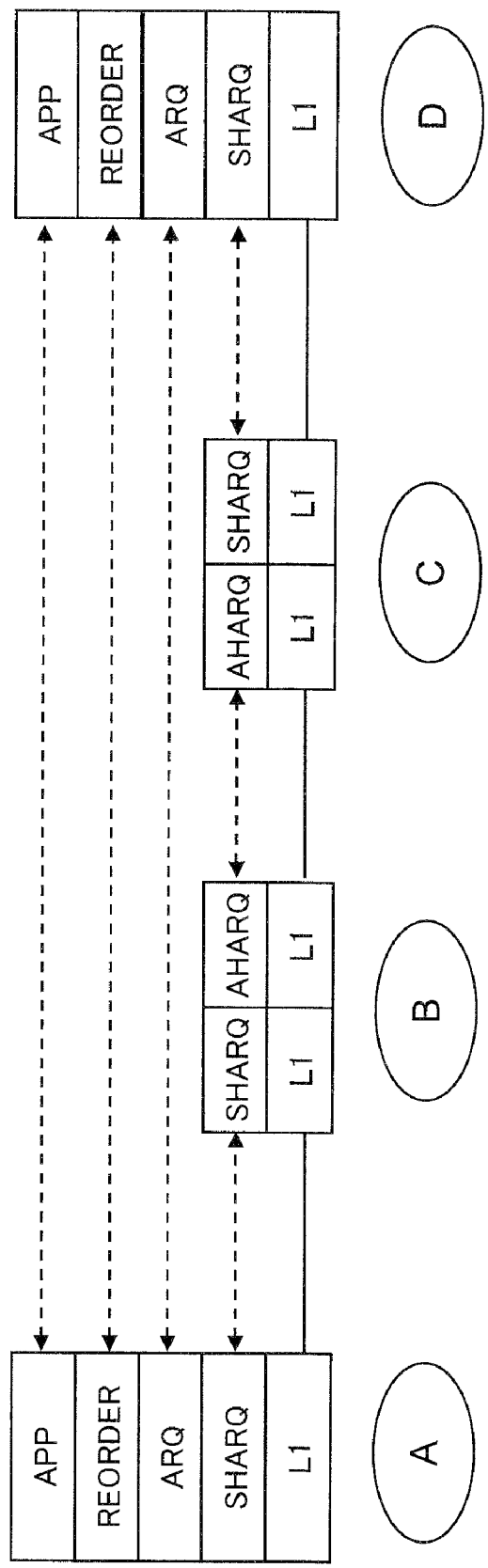
FIG. 9 is a diagram showing protocol stacks in a multi-hop system according to a second example of the present invention.

FIG. 9 is a diagram showing protocol stacks in a multi-hop system according to another example of the present invention. The system shown in FIG. 9 has a system structure similar to the system shown in FIG. 7 but is different in the point that a pair of HARQ protocols for each hop is independent of the others.

Specifically, a pair of synchronous HARQ (SHARQ) protocols is set between the transmitting node A and the transit node B, a pair of asynchronous HARQ (AHARQ) protocols, between the transit nodes B and C, and a pair of SHARQ protocols, between the transit node C and the receiving node D. Even if a pair of HARQ protocols is set independently for each hop as described above, it is possible to apply the transmission profile control according to the present invention.

For example, as described above (see "2. Cumulative Arrival Delay CUM_DLY"), in the case where the retransmission process is the synchronous HARQ, the number of transmissions through the HARQ protocol detected by the node B is supposed to be an arrival delay DLY(B). In the case where the retransmission process is the asynchronous HARQ, the period from the arrival time of a packet indicator detected at the first time by the node C until the packet is completely received is supposed to be an arrival delay DLY(C).

8. Third Example

Figure 10:
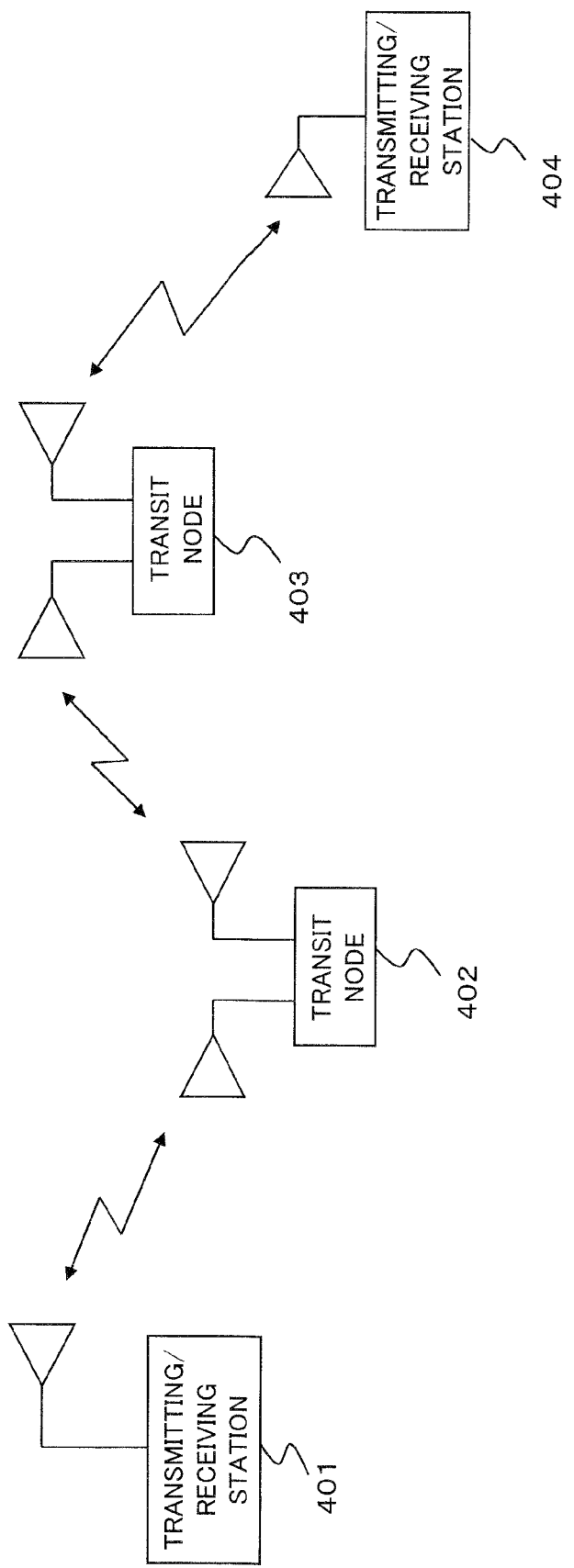
FIG. 10 is a block diagram showing a structure of a wireless multi-hop system according to a third example of the present invention.

FIG. 10 is a block diagram showing a structure of a wireless multi-hop system according to a still another example of the present invention. Here, wireless transit nodes 402 and 403 relay between wireless transmitting/receiving stations 401 and 404. Each hop in the multi-hop system according to the present invention may be any one of a cable link and a radio link. However, a case where every hop is a radio link is also one of preferred examples.

Note that the transmission profile control in each of the above-described first to third examples may be carried out at every transit node in the multi-hop system, or also may be carried out at some of the transit nodes in the system.

9. Various Aspects

As described above, the present invention provides a data transmission method and device by which an arrival delay can be controlled. Further, the present invention provides a data transmission method and system by which an arrival delay in the entire system can be controlled in accordance with a target arrival delay. Still further, the present invention provides a transit node that can control a cumulative arrival delay in the entire system, without complicating the structure and configuration.

According to the present invention, a transmission profile is controlled based on a target cumulative delay to transmit a data signal to a downstream node. For example, the transmission profile is controlled based on a result of comparison of the target cumulative delay and a cumulative arrival delay of the data signal which arrives at the node. The transmission profile is controlled so that an expected cumulative delay obtained from the transmission profile becomes closer to the target cumulative delay at the downstream node.

The transmission profile may be a transmission parameter by which a number of retransmissions of the data signal between the node and the downstream node can be probabilistically adjusted. In other words, the transmission parameter can be used to adjust a probability of occurrence of an error or incompletely reception of the data signal. The transmission parameter may be transmission power, transmission channel (timing and/or frequency band) or the number of transmission antennas. Taking transmission power as an example, the probability of starting the retransmission process increases as the transmission power is lowered, resulting in the elongated arrival delay of a data signal. The probability of starting the retransmission process decreases as the transmission power is increased, resulting in the shortened arrival delay of a data signal.

In a multi-hop system, a transit node, which may be part of the multi-hop system, controls a transmission profile of a data signal based on a cumulative arrival delay, and transmits the data signal including the cumulative arrival delay to a downstream node. Accordingly, the transmission of the data signal through the entire multi-hop system can be controlled so that the cumulative delay over the system becomes closer to a target cumulative delay.

As described above, since a transmission profile used in transmission to a downstream node is controlled based on a target cumulative delay, it is possible to control an arrival delay without complicating the structure and configuration. A transmission delay particularly between nodes having a retransmission protocol can be controlled only by setting transmission parameters such that variations will occur in the probability that a retransmission operation takes place.

In addition, if applying the present invention to a transit node in a multi-hop system, the transmission of a data signal can be controlled so that the delay becomes closer to a target cumulative delay throughout the system, without complicating the structure and configuration.

The present invention can be applied to data transmission systems in general in which data is transmitted through a transit node or transit nodes. The present invention can also be applied to a wireless communications system or mobile communications system including a radio link.

The present invention may be embodied in other specific forms without departing from the spirit or essential characteristics thereof. The above-described exemplary embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A data transmission method for transmitting a data signal to a second node, the data transmission method comprising:
a first node estimating an expected cumulative delay at the second node to which the data signal is to be transmitted from the first node, the estimating being based on a transmission profile in order to control transmission of the data signal from the first node to the second node based on a target cumulative delay;
the first node controlling the transmission profile so that the expected cumulative delay at the second node converges to the target cumulative delay; and
the first node transmitting the data signal to the second node according to the transmission profile controlled by the first node.

2. The data transmission method according to claim 1, wherein the transmission profile is controlled based on a result of comparison of the target cumulative delay and a cumulative arrival delay of the data signal which arrives at the first node.

3. The data transmission method according to claim 1, wherein the transmission profile is a transmission parameter by which a number of retransmissions of the data signal between the first node and the second node is probabilistically adjusted.

4. A data transmission method for transmitting a data signal to a downstream node, the data transmission method comprising:

a node controlling a transmission profile to control transmission of the data signal to the downstream node based on a target cumulative delay;

the node reading cumulative arrival delay information from the data signal, wherein the cumulative arrival delay information was written in the data signal by an upstream node;

the node calculating the cumulative arrival delay from the cumulative arrival delay information and an arrival delay that has occurred to the data signal between the upstream node and the node; and the node transmitting the data signal in which the cumulative arrival delay is written as cumulative arrival delay information, to the downstream node.

5. The data transmission method according to claim 1, wherein the target cumulative delay is predetermined based on a total target delay of the data signal from a source node to a destination node.

6. The data transmission method according to claim 5, wherein the target cumulative delay is previously set for each node before the data signal is transmitted from the source node to the destination node.

7. The data transmission method according to claim 5, wherein the target cumulative delay is determined at each node when the data signal arrives at that node.

8. A data transmission device which transmits a data signal from a first node to a second node downstream of the first node, the data transmission device comprising:

a transmission profile controller for estimating an expected cumulative delay at the second node based on a transmission profile in order to control transmission of the data signal from the first node to the second node based on a target cumulative delay, and controlling the transmission profile so that the expected cumulative delay at the second node converges to the target cumulative delay; and a transmitter for transmitting the data signal to the second node according to the transmission profile controlled by the transmission profile controller.

9. The data transmission device according to claim 8, wherein the transmission profile controller controls the transmission profile based on a result of comparison of the target cumulative delay and a cumulative arrival delay of the data signal which arrives at the data transmission device.

10. The data transmission device according to claim 8, wherein the target cumulative delay is predetermined based on a total target delay of the data signal from a source node to a destination node.

11. The data transmission device according to claim 8, further comprising:

a transmitting-side retransmission controller for controlling a retransmission process with the second node;

wherein the transmission profile controller controls a transmission parameter by which a number of retransmissions of the data signal performed by the transmitting-side retransmission controller is probabilistically adjusted.

12. A data transmission device that transmits a data signal to a downstream node, the data transmission device comprising:

a transmission profile controller for controlling a transmission profile to control transmission of the data signal based on a target cumulative delay;

a transmitter for transmitting the data signal to the downstream node according to the controlled transmission profile;

an arrival delay calculator for calculating an arrival delay that has occurred to the data signal between an upstream node and the data transmission device;

a cumulative arrival delay calculator for calculating a cumulative arrival delay from the arrival delay and cumulative arrival delay information read from the data signal, wherein the cumulative arrival delay information was written in the data signal by an upstream node; and a cumulative delay update section for writing the cumulative arrival delay as cumulative arrival delay information to the data signal.

13. The data transmission device according to claim 12, further comprising:

a receiving-side retransmission controller for controlling a retransmission process with the upstream node, wherein the arrival delay is calculated based on a number of retransmissions of the data signal performed by the receiving-side retransmission controller.

14. A communication system comprising a transit node and a second node downstream of the transit node, the communication system for transmitting a data signal from the transit node to the second node:

the transit node comprising, a transmission profile controller for estimating an expected cumulative delay at the second node based on a transmission profile in order to control transmission of the data signal from the transit node to the second node based on a target cumulative delay, and for controlling the transmission profile so that the expected cumulative delay at the second node converges to the target cumulative delay, and a transmitter for transmitting the data signal from the transit node to the second node according to the transmission profile controlled by the transmission profile controller;

the second node comprising a receiver for receiving the data signal transmitted from the transit node.

15. The communication system according to claim 14, wherein the transmission profile controller controls the transmission profile based on a result of comparison of the target cumulative delay and a cumulative arrival delay of the data signal which arrives at the transit node.

16. The communication system according to claim 14, wherein the target cumulative delay is predetermined based on a total target delay of the data signal from a source node to a destination node.

17. A non-transitory computer readable medium storing a program than when executed causes the computer to function as a data transmission device which transmits a data signal the computer executing the steps of:

estimating an expected cumulative delay at the downstream node based on a transmission profile in order to control transmission of the data signal from the computer to the downstream node based on a target cumulative delay;

controlling the transmission profile so that the expected cumulative delay at the downstream node converges to the target cumulative delay; and transmitting the data signal to the downstream node according to the transmission profile controlled by the computer.

18. A method, the method comprising:

at a source communication device, determining a probability of retransmission of a data signal from the source communication device to a destination communication device based on a target delay time, wherein the target delay time is predetermined based on a total target delay time of the data signal from the source communication device to the destination communication device;

transmitting the data signal between the source communication device and the destination communication device wherein both the source communication device and the destination have a retransmission protocol.

19. The method according to claim 18, wherein the source communication device further determines a probability of incomplete reception of the data signal.

20. The method according to claim 19, wherein the source communication device changes a transmission channel of the data signal.

21. The method according to claim 19, wherein the source communication device changes a number of transmission antennas used for transmission of the data signal.

22. The method according to claim 21, wherein the retransmission protocol is HARQ (Hybrid Automatic Repeat request).

23. The method according to claim 19, wherein the source communication device adjusts transmission power of the data signal.

* * * * *